(No Model.)

A. J. WRIGHT.
STEAM SEPARATOR.

No. 492,081. Patented Feb. 21, 1893.

WITNESSES

INVENTOR
Allen J. Wright
by
ATTORNEY

UNITED STATES PATENT OFFICE.

ALLEN J. WRIGHT, OF CLEVELAND, OHIO.

STEAM-SEPARATOR.

SPECIFICATION forming part of Letters Patent No. 492,081, dated February 21, 1893.

Application filed April 18, 1892. Serial No. 429,564. (No model.)

*To all whom it may concern:*

Be it known that I, ALLEN J. WRIGHT, a citizen of the United States, residing at Cleveland, in the county of Cuyahoga and State of Ohio, have invented certain new and useful Improvements in Steam-Separators; and I do hereby declare the following to be a full, clear, and exact description of the invention, such as will enable others skilled in the art to which it appertains to make and use the same.

My invention relates to devices for separating from live steam the water mechanically carried therewith: The object of the invention is to more completely effect that separation, and it consists in an improved method of collecting and conducting away such water, whereby the steam is more efficiently dried than by the devices now in use, and is embodied in apparatus of the general arrangement and construction hereinafter described.

Figure 1:
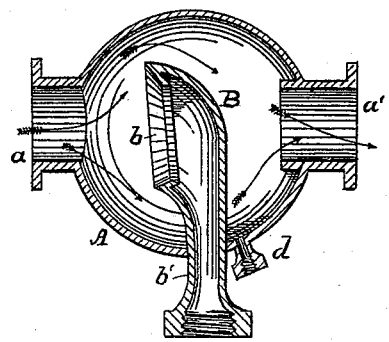
Figure 2:
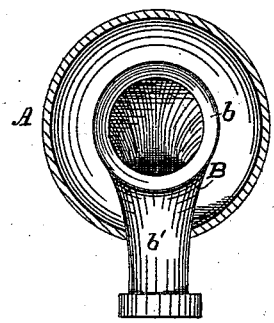
Figure 3:
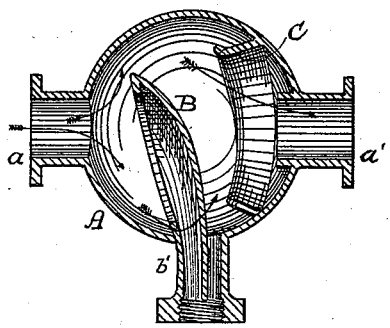
Figure 4:
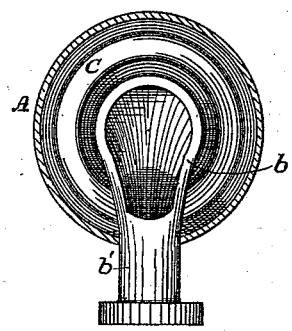
Figure 5:
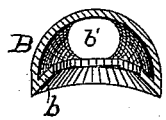
Figure 6:

In the drawings Figure 1 represents a central, vertical, longitudinal section of a device embodying my invention: Fig. 3 represents a similar section of a slightly modified form of construction thereof; Fig. 2 represents a central, vertical, transverse section of the device shown in Fig. 1, and Fig. 4 a like section of the device shown in Fig. 3, the baffle-plate B being, for clearer illustration, shown in elevation in Figs. 2 and 4; Fig. 5 is a horizontal section through the baffle plate B shown in Fig. 1, and Fig. 6 is a like section through the form shown in Fig. 3, the line of section in each case passing through the center of the inlet and outlet of the separator chamber.

A represents the separator chamber, $a$ the inlet, and $a'$ the outlet thereof; the chamber being connected at any suitable point in the line of steam supply pipe in the usual manner.

B represents a baffle-plate interposed in the line of steam current, and preferably curved toward the entering current.

$b$ is a rim or flange around the edge of plate B upon the inlet side thereof, to prevent any of the water intercepted by plate B from being blown or carried off the plate, and to aid in conducting it to its outlet.

$b'$ represents the tubular lower part of the baffle plate, forming an outlet for the water.

C represents an annular rib projecting from the wall of the exit side of the chamber, $d$ represents an auxiliary water outlet.

It is well understood that the presence of unvaporized water in steam is very objectionable, and that steam at ordinary pressures and unless superheated carries in suspension a considerable amount of unvaporized water. Great damage is often caused to machinery in consequence of water mechanically carried by or condensed from the steam, and accumulating in the pipes, getting into engine cylinders or other places into which only steam is designed to enter, and various means are used to exclude it. Steam separators designed to effect the removal of the water carried by the steam and that condensed in the pipes, have long been in use with more or less success, but all of such of which I have any knowledge are defective in operation to a greater or less degree in consequence of their failure to provide for all of the peculiar properties of steam.

The water mechanically carried by steam being heavier than the steam vapor is theoretically supposed to fall when the current of steam is checked, also to be carried beyond the current by centrifugal force when the current is caused to suddenly change its direction. Capillary attraction is also supposed to hold the water upon the surface against which it is so thrown, and upon these theories various forms of separators have been constructed, the current of steam in many cases being turned downward at its entrance, to facilitate the depositing of the water, and made to impinge upon baffle plates, or other obstructions, interposed to collect the water upon their surface. A common defect of construction in such devices has been that the water intercepted and deposited upon the baffle plates and walls of the separator has remained exposed to the current of steam while trickling down the plates or walls of the chamber to its receptacle or outlet, and in most cases the water flows or trickles through the midst of the steam current by dropping from the plates, owing to the latter being so arranged that steam circulates freely around them. Under such circumstances the steam will absorb and take up mechanically a considerable amount of the water exposed to contact with it, so that separators so arranged are able to extract but a very moderate portion of the water carried by the steam. It is my object to overcome the foregoing difficulties by so constructing the separator that the water, when once separated from the steam, is no longer exposed to contact with the current of steam, but is conducted away out of contact therewith, and the re-absorption of it by the steam prevented. To that end I arrange the separator so that the entering current of steam is met by a baffle plate which deflects it sharply, but is so shaped that it prevents the watery particles being thrown back into the current of steam, and causes them to gravitate into the lower closed part, in which the steam does not circulate, whence the water as it accumulates passes away without contact with any circulation of steam. I prefer to form the baffle-plate somewhat in funnel shape, as shown in Fig. 1, or spoon-shaped, as in Fig. 3, with the opening turned toward the steam inlet, and extending laterally and vertically beyond the inlet. This causes the steam current impinging upon the baffle-plate to deflect sharply in every direction, while the dead steam collecting in the funnel like mouth of the plate acts as a steam cushion to the entering current. The water carried by the steam is by the impetus of the current thrown against the plate B at an angle with its surface, and by its gravity and the impetus of its motion flows down the plate to its closed lower part, while the current of steam, being lighter, passes on every side backward and around the plate B, but chiefly upward, to the exit side of the separator chamber, without again coming in contact with any of the water it has parted with, and passes out completely dry. The flange or rim $b$ prevents any of the water which strikes the plate from being thrown back or driven off the sides of the plate. Outlet for the water collected by the plate B and passing into the tubular part $b'$ is provided by attaching a pipe thereto and conducting it to any desired point. An outlet for any water which escapes the plate B, or which may deposit on the walls of the chamber, may be afforded by a small separate outlet $d$, or preferably by passing the tubular part $b'$ of the plate B through an outlet into which the chamber A opens, as seen in Fig. 3.

In cases where from the great length or lack of covering of the steam supply pipe in which the separator is placed the amount of water is unusually large, I prefer, in addition to the plate B, to employ in the exit side of the chamber A, a projecting rib C surrounding the steam outlet pipe and projecting forward toward the plate A, as shown in Fig. 3. This rib meets the steam coming around the baffle plate in such a direction that any water still carried by the steam is thrown upon this rib, which acts, of course, as a second baffle plate, and flows to the angle where the rib joins the wall of the chamber, down which angle it flows to the bottom of the chamber and escapes. The rib C is so shaped that its free edge is higher than the back at all points, instead of depending at the top, and thus the water is prevented from trickling over the free edge of the plate and forced to follow around the rib to the bottom, where an opening for its escape is provided. More than one such rib may be used if preferred, but I regard one as sufficient, since the end of the exit pipe, $a'$, projecting into the chamber A as shown, also acts to some extent as a baffle plate. The course of the steam through the separators is shown by the arrows.

What I claim as my invention, and desire to secure by Letters Patent, is—

1. A steam separator consisting essentially of a separating chamber with steam inlet and outlet thereto and having a water outlet at its lower part, a curved baffle plate of larger area than the steam inlet located in said chamber opposite the steam inlet and having a flanged upper portion to intercept and collect the water and a tubular lower portion to conduct away the water, substantially as described.

2. In a steam separator the combination with the separating chamber having steam inlet and outlet and a water outlet at its lower part, of the funnel-shaped baffle plate located in said chamber with its mouth opposite the steam inlet and terminating at its lower part in the water outlet, substantially as described.

3. In a steam separator the combination of the separating chamber having steam inlet and outlet and a water outlet at its lower part, a curved baffle plate located in said chamber opposite the steam inlet and having its upper part flanged and its lower part contracted to a tube for carrying away the water, and a rib or ribs arranged in the exit side of said chamber and projecting forward toward the baffle-plate, substantially as described.

In testimony whereof I hereto affix my signature in presence of two witnesses.

ALLEN J. WRIGHT.

Witnesses:
LOREN PRENTISS,
WM. G. TAYLOR.